United States Patent
Dayton

(10) Patent No.: US 12,543,885 B2
(45) Date of Patent: Feb. 10, 2026

(54) BREWING APPARATUS, SYSTEM AND METHOD WITH ADJUSTABLE PRESSURE

(71) Applicant: Ricconics LLC, Charlotte, NC (US)

(72) Inventor: Roderick M. Dayton, Charlotte, NC (US)

(*) Notice: Subject to any disclaimer, the term of this patent is extended or adjusted under 35 U.S.C. 154(b) by 848 days.

(21) Appl. No.: 17/706,515

(22) Filed: Mar. 28, 2022

(65) Prior Publication Data

US 2022/0304501 A1   Sep. 29, 2022

Related U.S. Application Data

(60) Provisional application No. 63/166,789, filed on Mar. 26, 2021.

(51) Int. Cl.
| | |
|---|---|
| A47J 31/06 | (2006.01) |
| A47J 31/36 | (2006.01) |
| A47J 31/52 | (2006.01) |

(52) U.S. Cl.
CPC ....... *A47J 31/5251* (2018.08); *A47J 31/0663* (2013.01); *A47J 31/3671* (2013.01)

(58) Field of Classification Search
CPC . A47J 31/5251; A47J 31/0663; A47J 31/3671
See application file for complete search history.

(56) References Cited

U.S. PATENT DOCUMENTS

2019/0298101 A1* 10/2019 Prefontaine ............. A47J 31/34

FOREIGN PATENT DOCUMENTS

| CN | 206190994 U | * | 5/2017 | |
|---|---|---|---|---|
| DE | 102015220439 A1 | * | 4/2017 | ........ A47J 31/3666 |
| EP | 3323325 A1 | * | 5/2018 | ........... A47J 31/057 |

OTHER PUBLICATIONS

EP-3323325-A1 (Year: 2018).*
DE-102015220439-A1 (Year: 2017).*
CN-206190994-U (Year: 2017).*

* cited by examiner

*Primary Examiner* — Robert W Hodge
(74) *Attorney, Agent, or Firm* — Donald J. Firca, Jr.

(57) ABSTRACT

Provided are an apparatus and method that provides a brewing machine that produces a static water pressure with a variable water pressure. A first portion of an adaptor includes a peripheral wall that defines a region that receives heated water at a first pressure. A plurality of flanges protrude outwardly from the peripheral wall and cooperate with a group head of the brewing machine that is configured to receive and support a portafilter. A second portion is separate from the first portion, and arranged below the first portion to receive a portafilter basket. A conduit conveys water between the first portion and the second portion. A pressure regulator in fluid communication with the internal passage adjusts the heated water from the first pressure to a second pressure that is less than the first pressure, to be introduced to coffee in the portafilter basket at the second pressure.

8 Claims, 6 Drawing Sheets

BREWING APPARATUS, SYSTEM AND METHOD WITH ADJUSTABLE PRESSURE

BACKGROUND OF THE INVENTION

1. Field of the Invention

This application relates generally to a method, apparatus and system for brewing a coffee-based beverage and, more specifically, to a method, apparatus and system for adjusting a pressure of water exposed to coffee grounds during a brewing process.

2. Description of Related Art

Coffee brewers such as espresso machines include a boiler or other water heater to elevate the temperature of water to a desired brew temperature, and a pump that elevates the pressure of the heated water. A brew group of the espresso machine includes a group head with a receiver that receives and supports a portafilter that includes a basket containing ground coffee beans. Heated water is pumped at the brewing pressure into the basket with the ground coffee, forcing the heated water through the ground coffee and into a cup.

Traditionally, the pressure of the heated water is established by the pump of the espresso machine. The industry standard for an espresso machine is 9 bars of pressure, but the taste of the brewed beverage can be heavily dependent on the pressure of the heated water exposed to the ground coffee. For example, brewing a beverage with a water pressure of 15 bars extracts different qualities and/or different quantities of qualities from the ground coffee than brewing a beverage with a water pressure of 9 bars. However, espresso machines configured to produce a specific, static water pressure during brewing lack the ability to achieve the various different desired extractions that impart different flavor notes on the brewed beverage for a given ground coffee.

BRIEF SUMMARY OF THE INVENTION

Accordingly, there is a need in the art for an apparatus, system and method for varying the water pressure of heated water exposed to ground coffee by a brewing machine originally manufactured to produce a static water pressure. The present technology can retrofit a static-pressure brewing machine originally manufactured to produce a specific, static water pressure during brewing, allowing for adjustment of the water pressure to produce a brewed beverage with a desired taste.

For example, the present technology involves an adaptor that cooperates with a portion of a group head of a brewing machine that receives and supports a portafilter. According to some embodiments, the adaptor includes a first portion that is received by a receiver of the group head that is configured to receive the portafilter. For example, the first portion of the adaptor can be arranged at a vertical elevation of the adaptor adjacent to a top of the adaptor. Vertical elevations of the portions of the adaptor are described for the adaptor in an upright, operational orientation. The adaptor also includes a second portion, which can be arranged at a vertical elevation of the adaptor that is lower than the vertical elevation of the first portion. The second portion of the adaptor is configured to receive and support the portion of the portafilter that can be received by the receiver of the group head, to thereby couple the portafilter to the second portion of the adaptor.

Installation of the adaptor as part of the present system can include arranging the adaptor between the group head and the portafilter. In other words, the adapter can be introduced to the group head (e.g., raised vertically toward an underside of the group head), and pivotally adjusted to cause a portion of the adaptor to travel along a camming surface, thereby urging the adaptor toward the group head. Installation of the adaptor can mimic the installation of the portafilter on the group head. Similarly, the portafilter can be introduced to the bottom of the adaptor installed on the group head, and pivotally adjusted to cause a portion of the portafilter to travel along a camming surface adjacent to the second portion of the adaptor, thereby urging the portafilter toward the adaptor.

According to some embodiments, the adaptor also includes a water conduit that forms an internal passage through which heated water flows from the first portion of the adaptor to the second portion of the adaptor, and an adjustable pressure regulator disposed along the water conduit. The pressure regulator comprises a control device such as a knob, handle, switch, that is to be manipulated to adjust the water pressure of the heated water flowing through the water conduit. For example, a knob can be pivotally adjusted to step down the water pressure from the pressure generated by the brewing machine. Adjustment of the knob, handle or other control device can variably (e.g., infinitely, or continuously) adjust the water pressure, adjust the water pressure to one or a plurality of different steps, or otherwise change the water pressure of the heated water being introduced to the ground coffee in the basket of the portafilter.

According to some embodiments, the adaptor can be an intermediary device that is inserted like a portafilter into an E61 or other brew group head. A portafilter receptacle is formed on the underside of the adaptor, and after normal filling and tamping, the portafilter can be inserted into the underside of the adaptor, which allows pressure profiling with simple pivotal adjustment of a lever, knob or other control device, and optionally pressure monitoring.

Retrofitting a static-pressure espresso machine or other brewing machine with the adaptor is to make pressure profiling more readily available to the broad market. The adaptor allows the prosumer a broad range of coffee taste and preparation options such as developing lighter roasts and controlling pressure for an Americano style large coffee, or differently adjusting the water pressure to extract sweet notes from a darker roast.

Adjustment of the control device can be manual for ease of use, and lowest production and sale cost. However, some embodiments of the control device can include electronic control circuitry that issues control commands to control and actuate an automated valve or other pressure regulator to establish a desired pressure profile that is programmed into the system. For example, manually-input control instructions to establish a pressure profile can optionally be recorded into a computer-readable memory, to allow a pressure profile to be reproduced during a subsequent brew process by the electronic control circuitry. According to some embodiments, a pressure profile can be transmitted to the electronic control circuitry by a smartphone executing a brew app. The pressure profile can be manually input to the smartphone (e.g., pressure P1 for X seconds, followed by pressure P2 for Y seconds, etc.), downloaded from a remote network-accessible terminal (e.g., web server hosting a database of pressure profiles), etc.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF SEVERAL VIEWS OF THE DRAWING

The invention may take physical form in certain parts and arrangement of parts, embodiments of which will be described in detail in this specification and illustrated in the accompanying drawings which form a part hereof and wherein.

DETAILED DESCRIPTION OF THE INVENTION

Figure 1:
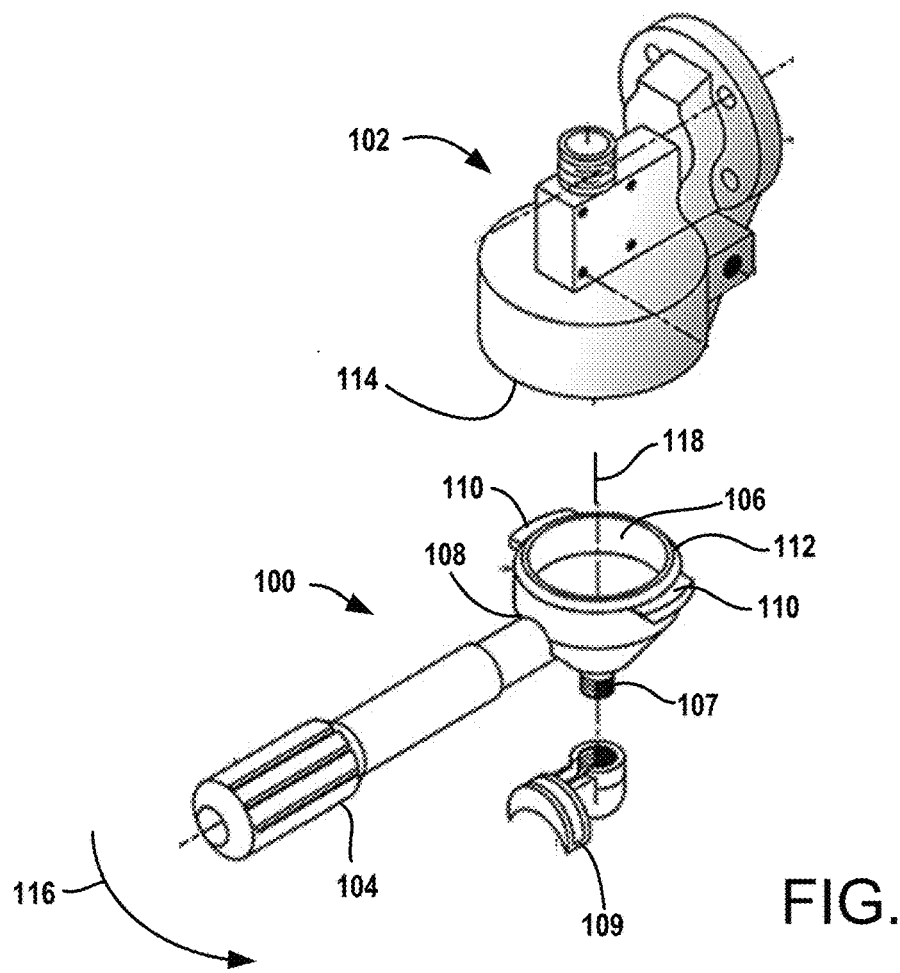
FIG. 1 shows an exploded view of a portafilter and a group head of an embodiment of a brewing machine.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

It is also to be noted that the phrase "at least one of", if used herein, followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget.

Figure 5:
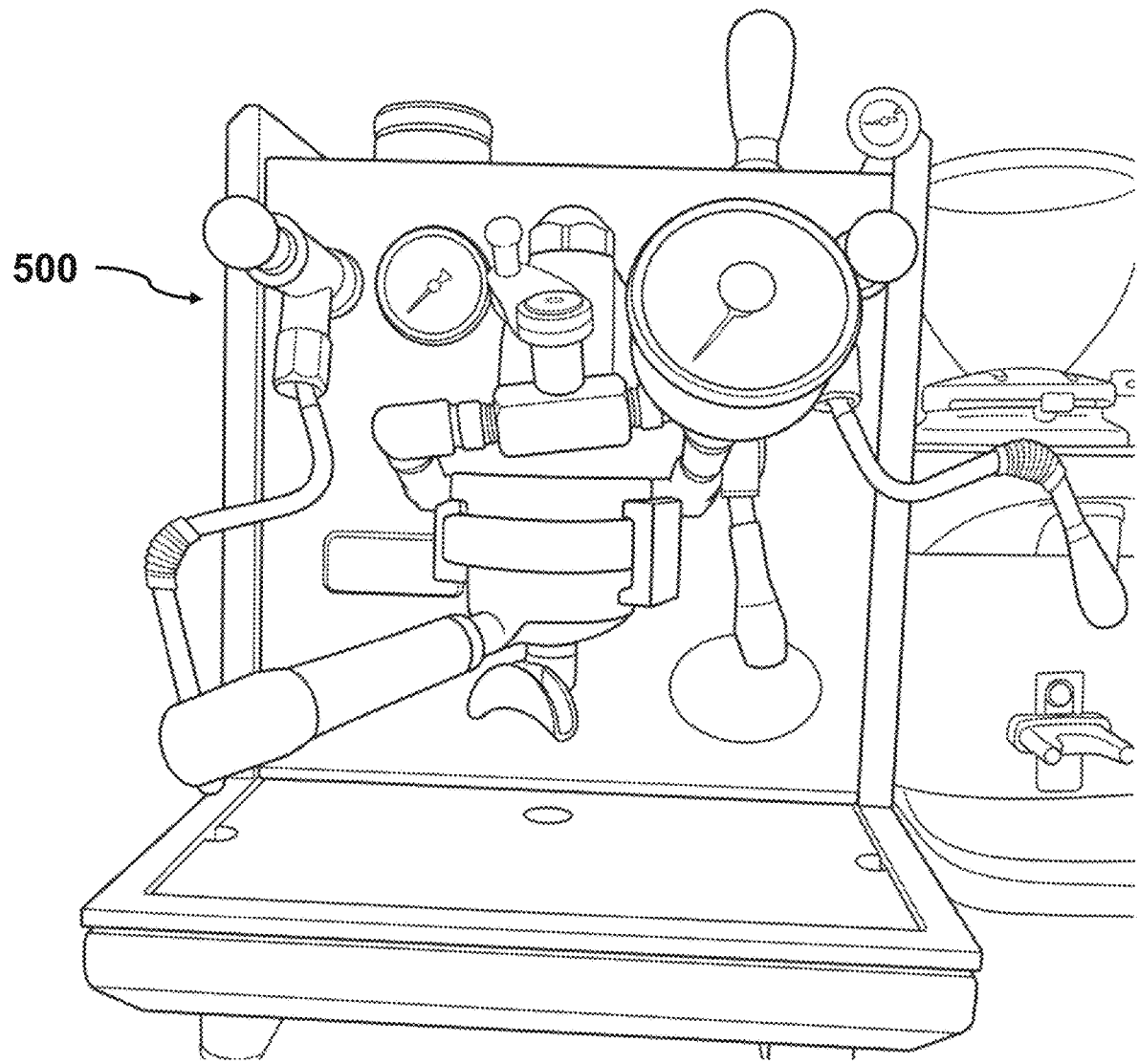
FIG. 5 shows a front view of an embodiment of a brewing machine including a group head, an embodiment of an adaptor installed on the group head, and a portafilter installed on the adaptor.

FIG. 1 shows an exploded view of an illustrative example of a portafilter 100 and a group head 102 of an illustrative example of a brewing machine 500 (FIG. 5). The embodiment of the brewing machine 500 is described and illustrated herein as an espresso machine for brewing coffee-based beverages using ground coffee beans, but other brewing machines are also considered within the scope of the present disclosure.

As shown in FIG. 1, the example of the portafilter includes a handle 104 supporting a basket 106 adjacent to a distal end 108. Ground coffee is received in the basket 106 and tamped into a compacted puck using a tamper (not shown). At least one, and optionally a plurality of flanges 110 protrude outwardly from a periphery 112 of the basket 106. For the embodiment in FIG. 1, the flanges 110 protrude out from opposite lateral sides of the basket 106, such as at the three o'clock and nine o'clock positions when viewing the top of the basket with the handle 104 extending to the six o'clock position of the basket 106.

The portafilter 100 can be installed on the group head 102 by elevating the basket toward the group head 102 so the flanges 110 are received into apertures formed in an underside 114 of the group head 102. With the flanges 110 received in the apertures, the handle can be pivotally adjusted in a direction indicated generally by arrow 116 about a central axis 118 of the basket 106 so the flanges 110 travel along one or a plurality of camming surfaces of the group head 102 that gradually slope in a vertically-upward direction, urging the basket toward the group head 102. As the flanges travel along the camming surface(s), the basket is secured through a friction fit against the group head 102, forming a seal between the basket 106 and the group head 102 that can withstand the brew pressure of the water generated by the brewing machine 500. As a result of this seal, water at the water pressure generated by the brewing machine 500 is introduced to the ground coffee in the basket 106, forcing the water through the puck of ground coffee. After passing through the ground coffee, the water with extracted coffee components exits the basket 106 through an outlet port 107, a nozzle 109 and into a cup, mug or other receptacle positioned vertically beneath the basket 106.

According to some embodiments, the brewing machine 500 lacks an adjustable pressure regulator that allows manual or electronic adjustment and control of the water pressure generated during brewing to be introduced to the ground coffee in the basket 106. For such embodiments the brewing machine 500 is configured to generate a static pressure profile, meaning that each time the brewing machine 500 is operated under standard conditions to brew a coffee-based beverage, the brewing machine 500 attempts to generate the same target pressure. During a brewing operation, the water pressure can be substantially (e.g., within ±10%) maintained by the brewing machine 500 at the target pressure for a majority of the brewing operation. For example, the target pressure can be at least 9 bars, at least 10 bars, at least 11 bars, at least 12 bars, etc., up to at least 15 bars for some models. In other words, each operation of the brewing machine 500 generates the same, or a similar pressure profile depending on other brewing conditions such as the pressure applied during tamping of the ground coffee, etc.

Figure 2A:
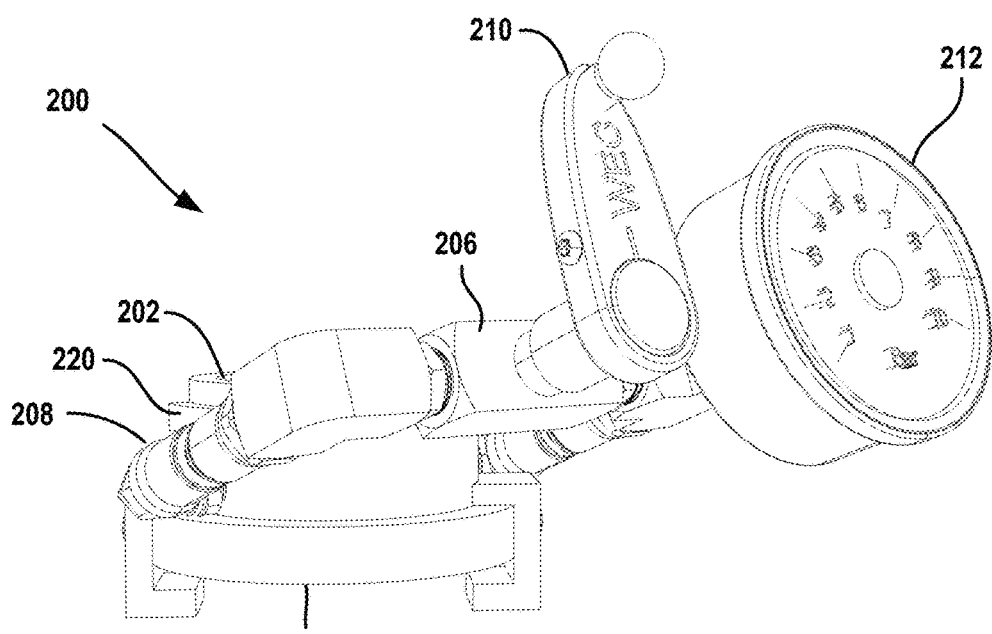
FIG. 2A shows a perspective view of an embodiment of an adaptor to be installed between a group head of a brewing machine and a portafilter containing ground coffee, the adaptor including a handle to be manipulated for controlling a water pressure of heated water to be introduced to the ground coffee contained by the portafilter.

FIG. 2A shows a perspective view of an embodiment of an adaptor 200 to be installed between the group head 102 of the brewing machine 500 and the portafilter 100 with the basket 106 containing the ground coffee. The adaptor 200 can be configured to be retrofit to a brewing machine 500 that generates a static pressure profile, giving such a brewing machine 500 the ability to generate a variable pressure profile, which allows the brewing machine 500 with the adaptor 200 to deliver water at different, variable pressures to ground coffee in the basket 106. In other words, installation of the adaptor 200 converts the brewing machine 500 from one with a fixed pressure profile, to one with an adjustable pressure profile. According to the embodiment illustrated in FIG. 2A, the adaptor 200 includes a first chamber 202 (e.g., upper or top portion) that receives heated water from the group head 102 at a first pressure, and a second chamber 204 (e.g., a lower or bottom portion) from which heated water is discharged at a second pressure to be introduced to the ground coffee in the basket 106.

The second pressure can be less than or equal to the first pressure. For example, heated water can be introduced by the brewing machine 500 to the first portion 202 of the adaptor 200 at fifteen (15) bars. Through adjustment of a pressure regulator 206 as described herein, the water pressure can be lowered to nine bars to be discharged from the second portion 204. Although the adjustment from fifteen (15) bars to nine (9) bars is used as one example, the pressure regulator 206 can be manipulated by a user to establish any desired pressure that is equal to, or less than fifteen (15) bars.

One or a plurality of flanges 220 can be provided to a portion of the adaptor 200 to couple the adaptor 200 to the brewing machine 500. For example, as shown in FIGS. 2A, 2B, 3 and 4, the flanges 220 can protrude from one or more lateral sides of the first portion 202 of the adaptor 200. Similar to the flanges 110 provided to the portafilter 100, the flanges 220 of the adaptor 200 are configured to be compatible with the group head 102 of the brewing machine 500. For example, the flanges 220 can protrude outwardly from a periphery 222 of the first portion 202 of the adaptor 200. For in the embodiments shown in FIGS. 2A, 2B, 3 and 4, the flanges 110 protrude out from opposite lateral sides of the first portion 202, such as at the three o'clock and nine o'clock positions when viewing the top of the first portion 202 from above.

The adaptor 200 can be installed on the group head 102 by elevating the adaptor 200 toward the group head 102 so the flanges 220 of the adaptor 200 are received into apertures formed in an underside 114 of the group head 102. According to some embodiments, the flanges 220 are constructed to be received within the same apertures of the group head 102 that would receive the flanges 110 of the portafilter 100. With the flanges 220 of the adaptor 200 received in the apertures of the group head 102, the adaptor 200, or at least the first portion 202 of the adaptor 200, can be pivotally adjusted in a direction indicated generally by arrow 301 (FIG. 3) about a central axis 305 of the adaptor 200 so the flanges 220 travel along one or a plurality of camming surfaces of the group head 102. The camming surfaces of the group head 102 gradually slope in a vertically-upward direction, urging the adaptor 200 toward the group head 102. As the flanges 220 travel along the camming surface(s) of the group head 102, the adaptor 200 is secured through a friction fit against the group head 102, forming a seal between the first portion 202 of the adaptor 200 and the group head 102 that can withstand the brew pressure of the water generated by the brewing machine 500. As a result of this seal, water at the water pressure generated by the brewing machine 500 is introduced to the first portion 202 of the adaptor 200. The adaptor 200 can optionally be pivotally adjusted in a direction opposite to the direction indicated generally by arrow 301 to remove the adaptor 200 from the group head 102.

A conduit 208 forms an internal passage that establishes fluid communication between the first portion 202 and the second portion 204. Although the conduit 208 is shown and described herein as comprising external tubing for the sake of brevity and clarity, alternate embodiments of the conduit can be machined, cast, or otherwise formed in the body of the adaptor 200. The pressure regulator 206 can be disposed along the fluid flow path established by the conduit 208 between the first portion 202 and the second portion 204 of the adaptor 200. A control device such as a knob, handle 210, etc. is coupled to the pressure regulator 206, and can be manipulated for controlling the pressure of heated water to be introduced to the ground coffee contained by the basket 106. The handle 210 is coupled to the pressure regulator 204, which is configured based on pivotal adjustment of the handle 202 to establish a desire water pressure of the heated water introduced to the ground coffee during brewing. For example, the handle 210 can be pivotally adjusted in a first angular direction to increase the pressure of the heated water output to be introduced to the ground coffee, up to the pressure of the heated water introduced to the pressure regulator 206. The handle 210 can be pivotally adjusted in a second angular direction, opposite the first direction, to decrease the pressure of the heated water output to be introduced to the ground coffee. Adjustment of the pressure of the heated water by the pressure regulator 206 can be infinitely variable, in an analog-type manner by rotation of the handle 210 or other controller, or discretely variable by adjusting the handle 210 or other controller to a plurality of detent settings, for example. A pressure gauge 212 can optionally be in fluid communication with the pressure regulator 206 to convey a visible indication of the outlet pressure of the heated water being discharged from the adaptor 200.

Figure 2B:
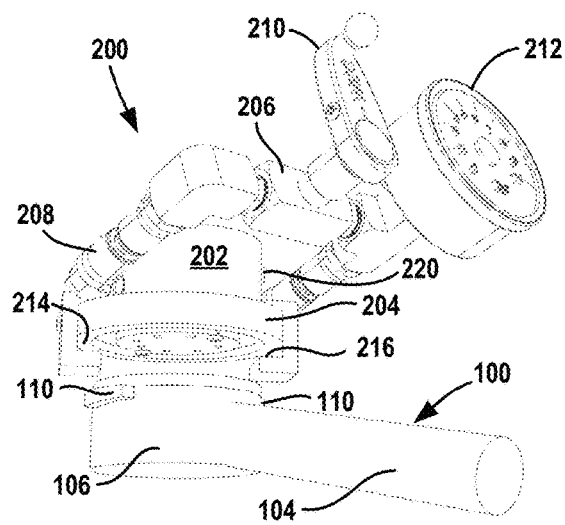
FIG. 2B shows an exploded, perspective view of an embodiment of an adaptor and a basket of a portafilter arranged adjacent to a portion of the adaptor for installation of the portafilter onto the adaptor.

FIG. 2B shows an exploded, perspective view of an embodiment of the adaptor 200 and the basket 106 of the portafilter 100 arranged adjacent to the second portion 204 of the adaptor 200 for installation of the portafilter 100 onto the adaptor 200. The basket 106 is elevated so the one or more flanges 110 are positioned adjacent to apertures 214 defined at least in part by camming surface(s) 216. When the handle 104 of the portafilter 100 is pivotally adjusted, the flanges 110 ride up the camming surfaces 216, urging the upper periphery of the basket 106 against the second portion 204 of the adaptor 200. Accordingly, the adaptor 200 is coupled to the group head 102, and the portafilter 100 is coupled to the adaptor 200. In other words, the adaptor 200 is disposed between the group head 102 and the portafilter 100 during a brewing operation.

Figure 3:
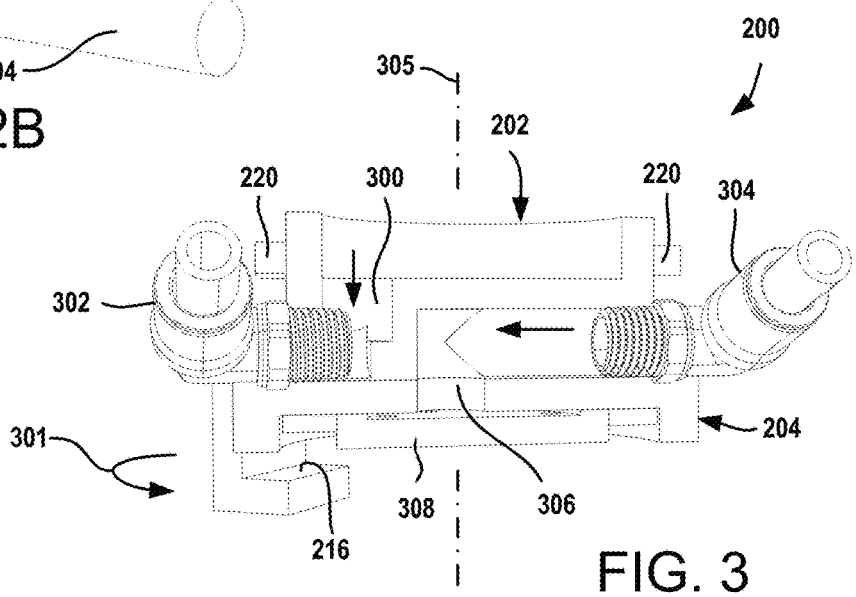
FIG. 3 shows a partially cutaway side view of an embodiment of an adaptor including a first portion to which heated water is to be introduced at a first pressure by a brewing machine, a second portion from which the heated water at an adjusted pressure (different from the first pressure) is discharged from the adaptor to be introduced to the ground coffee contained by the portafilter, and a water conduit that conveys the heated water between the first portion and the second portion of the adaptor.

FIG. 3 shows a partially cutaway side view of an embodiment of an adaptor 200 including the first portion 202, into which heated water is to be introduced at a first pressure by the brewing machine 500. The adaptor 200 also includes the second portion 204 from which the heated water at an adjusted pressure (different from the first pressure) is discharged from the adaptor 202 to be introduced to the ground coffee contained by the portafilter 100. The water conduit 208 (collectively formed from at least a first conduit member 302 and a second conduit member 304 in the present example) conveys the heated water between the first portion 202 and the second portion 204 of the adaptor 200.

Figure 4:
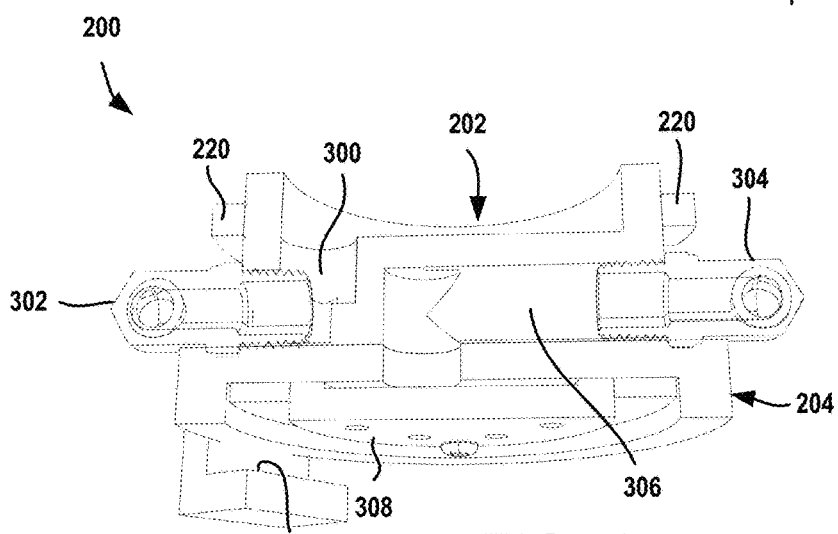
FIG. 4 shows a partially cutaway perspective view of the embodiment of the adaptor appearing in FIG. 3.
Figure 7:
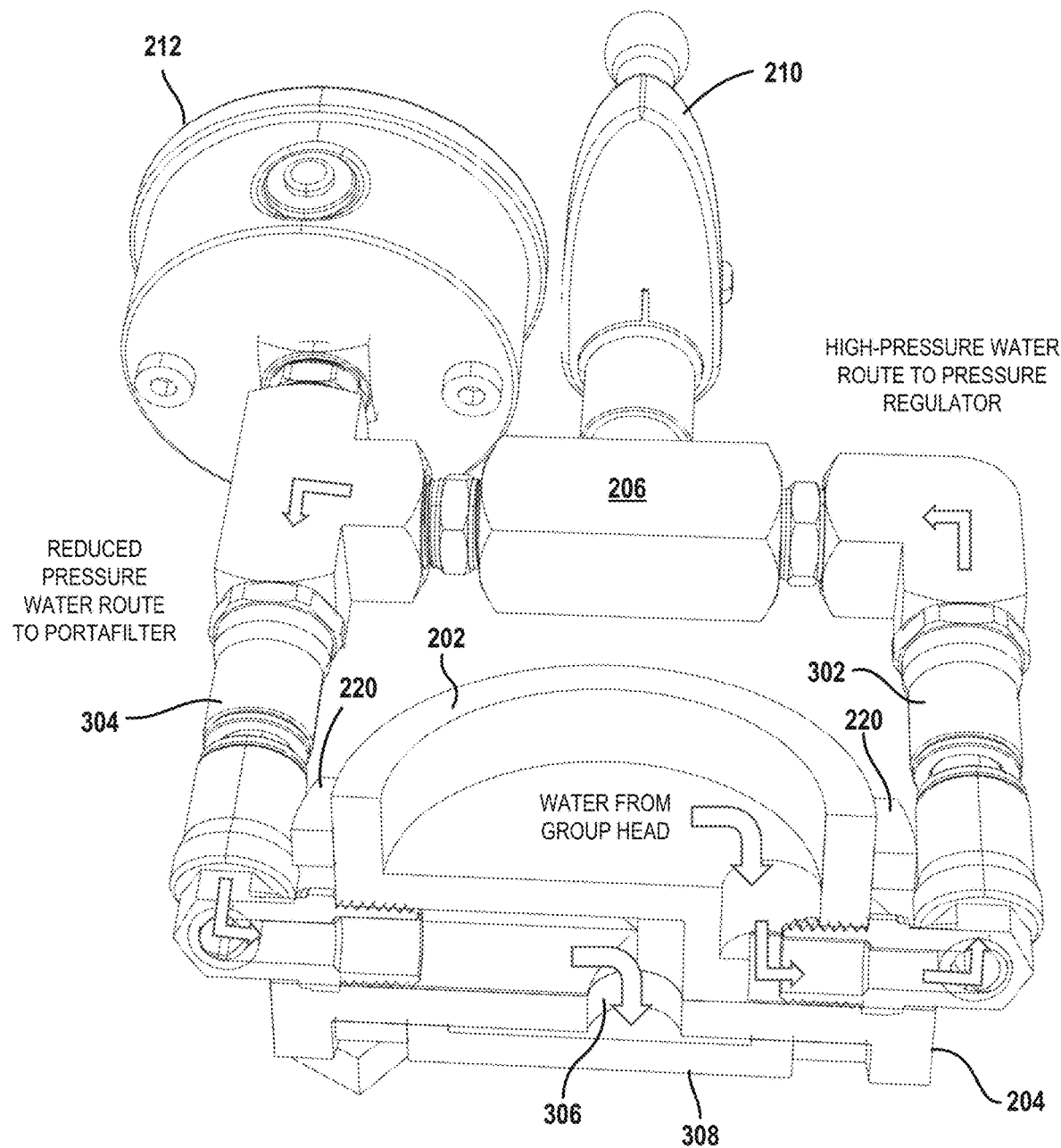
FIG. 7 is a rear view of an adaptor in accordance with some embodiments of the present technology, with arrows illustrating an example of a water flow path.

As shown in FIGS. 3, 4 and 7 the first portion 202 of the adaptor 200 defines an inlet aperture 300 establishing fluid communication into a first member 302 forming a portion of the conduit 208. Heated water from the group head 102 enters the first portion 202 of the adaptor 200 at a first pressure P1 produced by the brewing machine 500. The water from the group head 102 enters the first member 302 of the conduit 208 through the inlet aperture 300. The water flowing through the first member 302 encounters the pressure regulator 206 which, based on adjustment of the handle 210 or other control device, controls the outlet pressure P2 of the heated water that leaves the pressure regulator 206 and enters a second member 304 that also forms a portion of the conduit 208. The second pressure P2 is no greater than the first pressure P1, or is stepped down to a lower pressure than P1 based on the position of the handle 210 or other control device. The heated water at the second pressure P2 exits the second member 304 and flows through an outlet aperture 306 defined by the second portion 204 of the adaptor 200, and exits the adaptor 200 through a showerhead 308 to be introduced to the tamped ground coffee in the basket 106 at the second pressure P2.

Figure 6:
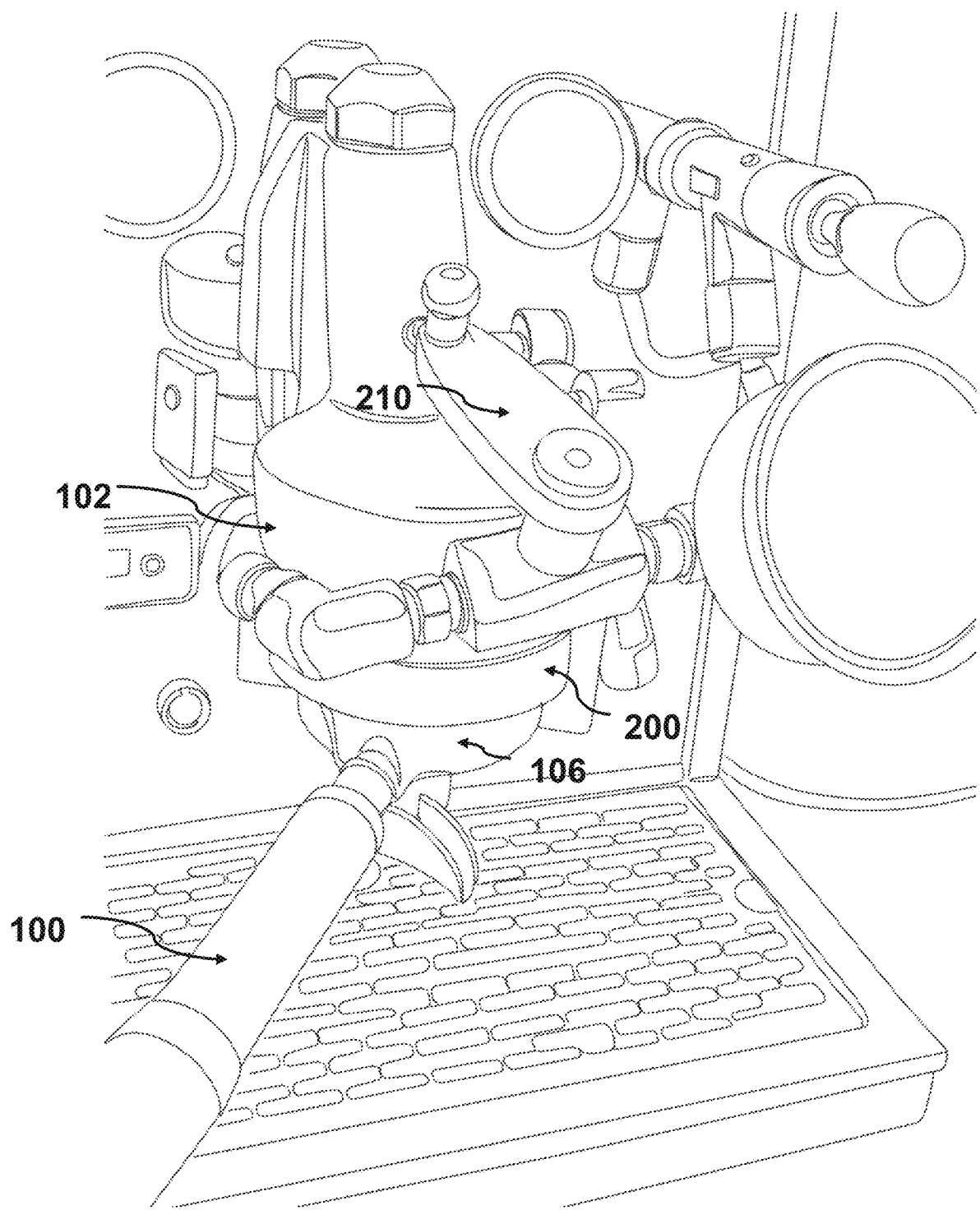
FIG. 6 shows a perspective view of the embodiment of the adaptor installed between the group head and the portafilter in FIG. 5.

FIG. 5 and FIG. 6 show views of embodiments of a brewing machine 500 including a group head 102, an embodiment of an adaptor 200 installed on the group head 102, and a portafilter 100 installed on the adaptor 200.

Figure 8:
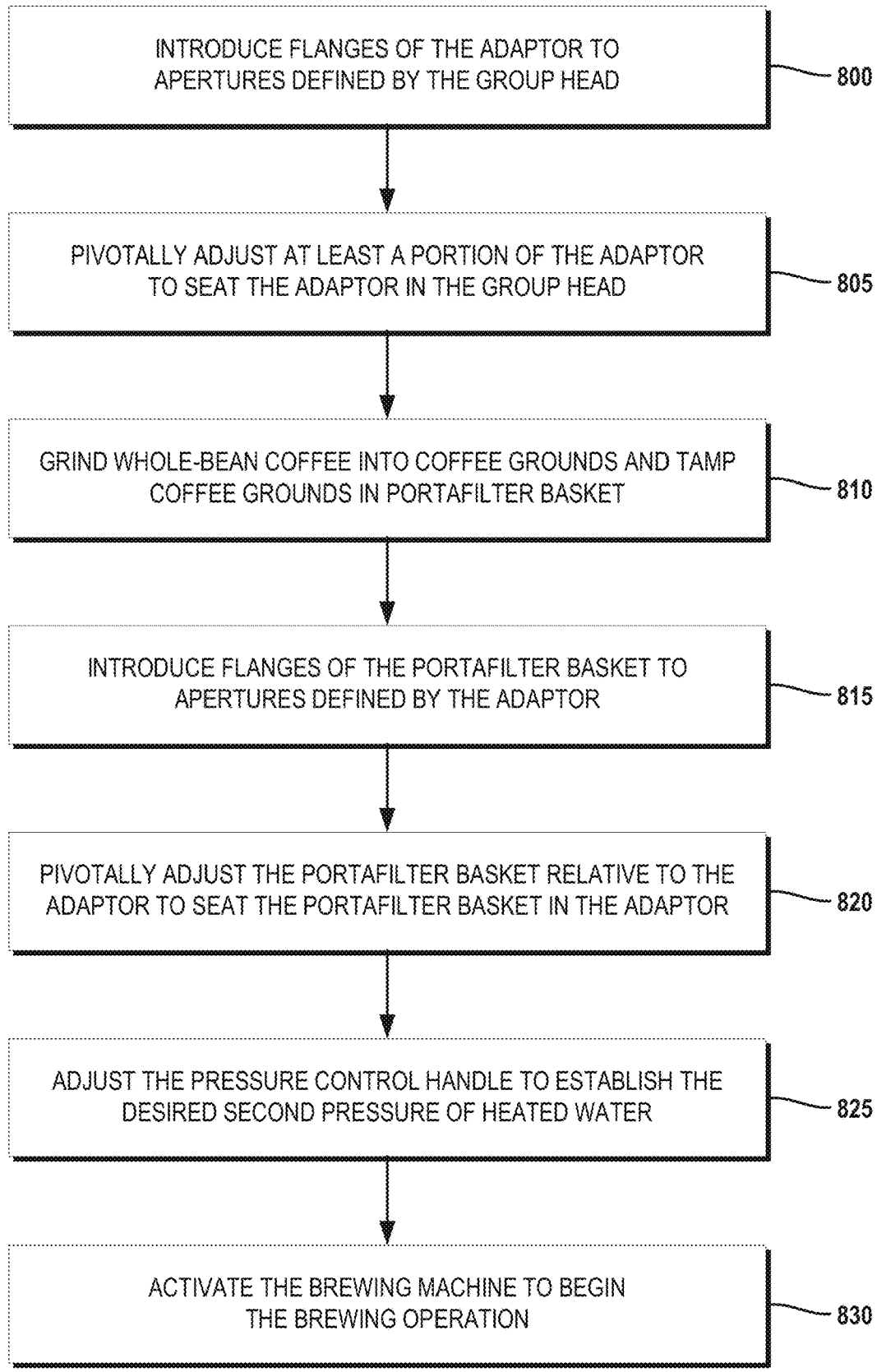
FIG. 8 is a flow diagram schematically depicting a process of using an adaptor to vary a pressure of a brewing machine to produce a coffee beverage.

An illustrative embodiment of a method of using the adaptor 200 is schematically depicted by the flow diagram of FIG. 8. As shown, the adaptor 200 can be firmly installed in the portafilter socket of the E61 (or other size) group head 102 by inserting the flanges 220 of the adaptor 200 into apertures defined by the group head 102 at block 800. With the flanges 220 in place, the adaptor 200, or at least the first portion 202 of the adaptor 200, can be pivotally adjusted in the angular direction of arrow 301 as shown in FIG. 3 at block 805. Such pivotal adjustment causes a portion of the flanges 220 to travel along camming surfaces within the portafilter socket of the group head 102, and forming a seal between the adaptor 200 and the group head 102. This seal is sufficient to withstand, and thereby maintain the first pressure P1 of the water supplied by the brewing machine 500.

To prepare the ground the portafilter 100 to brew a coffee beverage, whole-bean coffee is ground to the desired fineness and placed in the portafilter basket, where it is tamped using the desired force at block 810. The flanges 110 of the portafilter basket 106 containing the tamped coffee grounds are positioned within the apertures 214 defined by the second portion 204 of the adaptor 200 at block 815. The portafilter basket 106 is pivotally adjusted relative to the second portion 204 of the adaptor 200 at block 820, thereby causing the flanges 110 to travel along camming surfaces 216, firmly seating the portafilter basket 106 in the adaptor 200, and forming a seal between the adaptor 200 and the portafilter basket 106. This seal is suitable to withstand the second pressure P2 of the heated water to be established by the pressure regulator 206, and force the water through the tamped coffee in the portafilter basket 106 when the brewing machine 500 is activated.

The pressure control handle 210 or other controller can be adjusted at block 825 to set the desired pressure for the water at the second pressure P2. Adjustment of the pressure control handle 210 can occur before, or during the brewing process, allowing for the desired value of pressure P2 to be established and maintained constant throughout the brewing process, or be variable during the brewing process to set the target pressure at a plurality of different values during the brewing operation. At block 830 the brewing machine 500 pump is activated, and the pressure control handle 210 can optionally be adjusted (e.g., counterclockwise and/or clockwise, for example) to introduce heated water at the desired pressure to the puck. The gauge 212 indicates the pressure in Bar or other unit of measure during the brewing operation to provide real-time feedback to the operator.

Upon completion of the brewing operation, the portafilter can be emptied as usual and return to the socket of the adaptor 200 for storage and warming. The adaptor 200 can optionally be removed from the group head 102 by pivotally adjusting at least a portion of the adaptor 200 in the opposite angular direction from the direction of adjustment during installation.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

Illustrative embodiments have been described, hereinabove. It will be apparent to those skilled in the art that the above devices and methods may incorporate changes and modifications without departing from the general scope of this invention. It is intended to include all such modifications and alterations within the scope of the present invention. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An adaptor that provides a brewing machine that produces a static water pressure with a variable water pressure, the adaptor comprising:
   a first portion comprising a peripheral wall that defines a region that receives heated water at a first pressure from the brewing machine, and a plurality of flanges coupled to an exterior surface of the peripheral wall that protrude outwardly, away from the exterior surface of the peripheral wall and cooperate with a group head of the brewing machine, the group head being configured to receive and support a portafilter;
   a second portion that is separate from the first portion, and arranged at a vertical elevation on the adaptor that is lower than a vertical elevation of the first portion, wherein the second portion receives a portafilter basket;
   a conduit defining an internal passage through which water flows between the first portion of the adaptor and the second portion of the adaptor; and
   a pressure regulator in fluid communication with the internal passage that adjusts the heated water from the first pressure to a second pressure that is less than the first pressure, to be introduced to coffee in the portafilter basket at the second pressure.

2. The adaptor of claim 1 further comprising a showerhead coupled to the second portion of the adaptor, that distributes the heated water at the second pressure over coffee in the portafilter basket.

3. The adaptor of claim 1 further comprising a pressure gauge that provides a visible indication of the second pressure.

4. The adaptor of claim 1 further comprising a controller that is to be manipulated by a user to set a target pressure for the second pressure of the heated water.

5. The adaptor of claim 4, wherein the controller comprises a control handle that is manually adjustable to set the target pressure at a value of at least nine (9) bars.

6. The adaptor of claim 5, wherein the control handle is manually adjustable to set the target pressure at a value of up to fifteen (15) bars.

7. The adaptor of claim 4, wherein the control handle is adjustable during a brewing operation to adjust the target pressure to a plurality of different values during the brewing operation.

8. The adaptor of claim 1, wherein the conduit is coupled to the first portion of the adaptor and the second portion of the adaptor to establish fluid communication between the first portion of the adaptor and the second portion of the adaptor, and the pressure regulator is positioned along the conduit between locations where the conduit is coupled to the first portion of the adaptor and the second portion of the adaptor.

* * * * *